United States Patent
Saiki et al.

(10) Patent No.: US 6,199,317 B1
(45) Date of Patent: Mar. 13, 2001

(54) MATERIALS FOR GROWING ALGAE AND ARTIFICIAL FISHING BANKS

(75) Inventors: Masamichi Saiki, Tokyo; Akira Watanuki, Tsuchiura; Norikazu Hirose, Tsuchiura; Toru Aota, Tsuchiura; Shuuji Kitao, Yokohama; Yasunori Sennou, Tokyo; Keiko Horikawa, Fujisawa, all of (JP)

(73) Assignees: Tetra Co., Ltd; Toyo Glass Company Limited, both of Tokyo (JP)

( * ) Notice: Subject to any disclaimer, the term of this patent is extended or adjusted under 35 U.S.C. 154(b) by 0 days.

(21) Appl. No.: 09/319,173

(22) PCT Filed: Dec. 4, 1997

(86) PCT No.: PCT/JP97/04443
§ 371 Date: Jul. 6, 1999
§ 102(e) Date: Jul. 6, 1999

(87) PCT Pub. No.: WO98/24298
PCT Pub. Date: Jun. 11, 1998

(30) Foreign Application Priority Data

Apr. 12, 1996 (JP) .................................................... 8-337742

(51) Int. Cl.$^7$ .............................. A01G 7/00; A01K 61/00
(52) U.S. Cl. ................................................. 47/1.4; 119/221
(58) Field of Search .............................. 47/58.1, 1.4, 64; 119/221; 405/25, 21, 34; 435/410

(56) References Cited

U.S. PATENT DOCUMENTS 4,299,613 * 11/1981 Cardarelli ............................ 71/64 F
4,334,908 * 6/1982 Duchateau et al. .................... 71/52
5,262,233 * 11/1993 Sudo et al. .......................... 428/327
5,639,657 6/1997 Saiki et al. ........................... 435/410

FOREIGN PATENT DOCUMENTS 6-335330 12/1994 (JP) .
7-227172 8/1995 (JP) .
8-131016 5/1996 (JP) .

OTHER PUBLICATIONS

J.H. Martin et al., "Testing the iron hypothesis in ecosystems of the equatorial pacific ocean", Nature, vol. 371, Sep. 8, 1998, pp. 123–129.

* cited by examiner

Primary Examiner—Charles T. Jordan
Assistant Examiner—Aileen J. Baker
(74) Attorney, Agent, or Firm—Wenderoth, Lind & Ponack, L.L.P.

(57) ABSTRACT

Vitreous, algae growing materials, release stably ferrous ions, over long periods of time. The duration of ion release can be controlled as desired by adjusting the particle size of the materials. The vitreous, algae growing, materials can be converted into porous forms or fabricated into at least parts of structures. The vitreous, algae growing, materials consist essentially of 15 to 50 weight percent $SiO_2$, 1 to 35 weight percent either or both of $Na_2O$ and $K_2O$, 30 to 70 weight percent $B_2O_3$, and 1 to 40 weight prercent of either or both of $FeO$ and $Fe_2O_3$. Increasing the content of boron facilitates the release of ferrous ions from the vitreous, algae growing, materials.

4 Claims, No Drawings

MATERIALS FOR GROWING ALGAE AND ARTIFICIAL FISHING BANKS

FIELD OF THE INVENTION

This invention relates to materials for promoting marine plant and phytoplankton propagation that are placed on the surface of the sea or at depths where sunlight reaches, or in rearing facilities on land comprising borosilicate glass, containing boron and iron. This invention also relates to artificial reefs to rear fish and shellfish by promoting marine plant and phytoplankton propagation, at least a part of which is covered or built with the aforementioned borosilicate glass.

BACKGROUND OF THE INVENTION

Various types of steel, rock and concrete armor blocks have been placed on the bottom of the sea, either as they are or as assembled artificial reefs; to grow seaweed and other marine plant necessary to provide feeding and living grounds for fish and shellfish. Also, various contrivances have been used with these structures, to form appropriately rugged surfaces on them.

However, their functions are limited to providing substrata for seaweed and other marine plants to put their roots down on.

Seaweed and other marine plants including phytoplankton grow on various dissolved nutrients in seawater, including, nitrogen, phosphorus, silicon, manganese and iron. Particularly ferrous ions of iron dissolved in seawater are said to make significant contributions to their growth.

With this growth promoting effect in mind, the inventors proposed, as per Japanese Provisional Patent Publication No. 335330 of 1994 (Japanese Patent No. 2577319), algae rearing materials, consisting of vitreous materials, containing ferrous ions embedded therein that releas; when sunk into the sea, ferrous ions, stably, over long periods of time. The algae rearing materials, just mentioned comprise, by weight, 30 to 70 percent silicon dioxide, 10 to 50 percent sodium oxide and/or potassium oxide, 5–50 percent iron oxide, plus manganese oxide and phosphorus pentoxide as required, and containing not less than 1 percent ferrous ions. They are, for example, coated on to the surface of appropriate structures which are sunk into the sea. They promote the growth of seaweeds and other marine plants by providing suitable rearing sites for long periods of time by continuously releasing minute traces of ions into the surrounding seawater.

Recently, however, the vitreous materials are required to release more ferrous ions with a smaller glass supplies to fulfill the following needs:

1) To vitalize the entirety of seaweed beds with very small quantities of growth promoting materials.
2) To promote the growth of diatoms that become the initial feed in the rearing of abalone and sea-urchin by using smaller quantities of growth promoting materials releasing ferrous ions.
3) To promote growth of phytoplankton in offshore areas where plankton is difficult to grow because of the shortage of iron, by spraying small quantities of growth promoting materials over wide areas.

Conventional growth promoting materials, when added in large quantities to seawater in water tanks, or other closed systems, have a tendency to raise the pH of the seawater through the release of potassium, sodium and other alkalis. Acid additions are required to avoid this rise in pH. Therefore, growth promoting materials causing less pH increase are required.

Meanwhile, global warming caused by rising levels of atmospheric carbon dioxide presents a significant problem. Strategies on global warming that will lead to upsetting of ecosystem balances, and the rising of sea levels are being studied on a global scale.

One of possible solutions attracting attention is the growing of marine algae. While seaweed and seagrass grow on the bottom of relatively shallow coastal sea not deeper than 20 m, phytoplankton is distributed in large areas of sea all over the world to depths where sunlight penetrates. It is known that these marine plants annually absorb approximately 30 billion tons of carbon from seawater and convert it into organic matter. If, as such, the number and species of marine plants, especially phytoplankton that make up the greater part thereof, are increased, they will absorb and fix more carbon dioxide from seawater. If the carbon dioxide in seawater decreases, the sea will make up for the loss by taking in an equivalent amount of carbon dioxide from the atmosphere because of the equilibrium relationship between the atmosphere and the sea, thereby decreasing the amount of carbon dioxide in the atmosphere.

Based on this already known relationship, preliminary experimentation has already been carried out in the growing of phytoplankton by spraying solutions of ferrous ions over sea surface areas containing sufficient amounts of nitrogen, phosphorus, silicon and other elements needed by phytoplankton but lacking iron required for their growth. Such experimentation has proved that solutions of ferrous ions spread over the surface of the sea are effective for growing phytoplankton (see Martin et al. (1994); Testing the Iron Hypothesis in Ecosystems of the Equatorial Pacific Ocean, NATURE, vol. 378(8), Sept. pp. 123–129).

Although their effectiveness has been thus confirmed, spreading solutions of ferrous ions requires large quantities of water and enormous costs for transportation. Besides, it is difficult to maintain the effect of ferrous ions for long periods of time because their solutions readily diffuse from the area in which they are sprayed. This problem may be solved by supplying iron compounds that release ferrous ions at and near the surface of the sea. However, ordinary iron compounds and metallic iron cannot provide a long-lasting phytoplankton growing effect because they quickly sink from the surface to the bottom by virtue of their high specific gravities. Also, ordinary iron compounds and metallic iron are unsuitable for practical use as they cannot continue the stable release of ferrous ions over long periods of time.

While some vitreous materials, releasing ferrous ions of have been already proposed as mentioned earlier, it is desired to use such vitreous materials that release ferrous ions more efficiently with smaller glass supplies.

Now, an object of this invention is to provide algae growing materials consisting of vitreous materials, having greater capabilities to release ferrous ions.

Another object of this invention is to provide artificial reefs or other forms of seaweed beds prepared by shaping said algae growing materials, into various shapes or incorporating them in various substrata structures, that are to be placed in artificial rearing sites or facilities or in natural sea areas.

Algae, especially phytoplankton, grow by photosynthesis while floating or drifting at or near the surface of the sea or at depths having adequate light penetration. Ferrous ions promote the photosynthesis of phytoplankton. Therefore, it is necessary to continue a stable supply of ferrous ions to depths with adequate light penetration, preferably to depths of a few meters. Thus, still another object of this invention is to provide porous, algae growing materials capable of a long-lasting stable supply of ferrous ions, in sea areas where phytoplankton is distributed and consisting of vitreous materials releasing ferrous ions and having lower specific gravities than seawater.

SUMMARY OF THE INVENTION

This invention achieves the above objects by the following:

(1) An algae growing material consisting of a vitreous material capable of releasing ferrous ions into water and consisting essentially of, by weight, 15 to 50 percent $SiO_2$, 1 to 35 percent either or both of $Na_2O$ and $K_2O$, 30 to 70 percent $B_2O_3$, and 1 to 30 percent either or both of FeO and $Fe_2O_3$.

(2) An artificial reef for growing algae consisting of a reef structure consisting of, at least in part, or covered with a vitreous material capable of releasing ferrous ions into water and consisting essentially of, by weight, 15 to 50 percent $SiO_2$, 1 to 35 percent either or both of $Na_2O$ and $K_2O$, 30 to 70 percent $B_2O_3$, and 1 to 30 percent either or both of FeO and $Fe_2O_3$.

(3) A porous, algae growing material consisting of a porous, vitreous material having independent foamed pores, containing 1 to 40 percent either or both of FeO and $Fe_2O_3$ and capable of releasing ferrous ions into water.

(4) A porous, algae growing material consisting of a foamed vitreous material described in (3) above containing, in addition to the constituent described in (3), 15 to 50 percent $SiO_2$, 1 to 35 percent either or both of $Na_2O$ and $K_2O$, 30 to 70 percent $B_2O_3$.

This invention takes advantage of the amorphousness of vitreous materials. A matrix of an amorphous vitreous material, carrying iron, embedded therein, is capable of continuing a slow, stable and long-lasting release of ferrous ions into seawater by the erosive actions thereof. The large quantities of boron (30 to 70 percent as $B_2O_3$) added to vitreous materials accelerates the release rate of iron (ferrous ions) and makes a significant contribution to the growth of algae.

Vitreous materials form random network structure containing positive ions (network-former) such as silicon and boron combined with oxygen random network, positive ions (network-modifier) such as sodium and potassium entrapped in the network structures, and iron ions serving as network-former and network-modifier. When such a vitreous material is immersed in seawater, the $OH^-$ ions in water combine with the positive ions on the surface of the vitreous material and form NaOH and KOH which break the bonds between silicon and boron. The vitreous material gradually releases its constituents over a long period of time.

Generally, borosilicate glasses consisting essentially of boron (10 to 25 percent as $B_2O_3$) and silicon (under 70 percent as $SiO_2$) are known to have high chemical durability and heat resistance. This invention is based on a new discovery that glasses whose chemical durability is decreased by varying their boron content release large quantities of ferrous ions. In addition, the release of boron ions inhibits the rising of the pH of the surrounding water resulting from the release of alkalis (potassium, sodium, etc.) generally contained in vitreous materials.

DESCRIPTION OF THE PREFERRED EMBODIMENTS

A more detailed description of this invention is given in the following.

Vitreous algae growing materials of this invention contain silicon, sodium and/or potassium, boron and iron, in combinations within the following ranges, as the source for releasing ions.

Silicon, which is a basic component that forms an amorphous network structure, is contained within the range 15 to 50 weight percent as $SiO_2$. If the silicon content is under 15 percent, the network forming function of silicon becomes dependent on boron and the waterproofing quality of glass deteriorates. Even moisture in the atmosphere sometimes dissolves the network structure. If the silicon content exceeds 50 percent, the network structure becomes stronger, the strength of the glass itself also increases (both chemically and structurally), and the release of iron and other elements decreases.

Either or both sodium and potassium are contained, as $Na_2O$ and $K_2O$, within the range 1 to 35 weight percent in total. Sodium and potassium, when added within said range, break the network structure of the glass and control the release rate of iron ions.

Iron, which is indispensable for the release of ferrous ions plays an important role in the growth of algae, and is contained as either or both FeO and $Fe_2O_3$ within the range 1 to 40 weight percent. Under 1 percent, a sufficient release of ferrous ions is unobtainable. When contained in excess, on the other hand, iron precipitates as metallic iron, rather than entering the glass as iron ions. Then, uniform dispersion of iron is not attained in the glass. The metallic iron at the surface might break the glass because they have different coefficients of thermal expansion. Therefore, the upper limit of iron content is set at 40 weight percent.

Boron is contained, as $B_2O_3$, within the range 30 to 70 weight percent. As stated earlier, the addition of 30 percent or more boron changes the property of the glass and promotes the release of ferrous ions. However, boron addition in excess of 70 percent deteriorates the waterproofing quality of the glass.

This invention also provides algae growing materials consisting of porous, vitreous materials containing ions as FeO and/or $Fe_2O_3$ within the range 1 to 40 weight percent, and having a specific gravity of 0.1 to 1.0 and a capability to continuously release ferrous ions. The porous, vitreous materials having independent foamed pores and a specific gravity of 0.1 to 1.0, preferably 0.2 to 0.5, will float or drift on the surface of the sea or at depths permitting light penetration. The algae growing materials made of such materials can be fastened to buoys or other similar structures placed on the surface or in the sea. The ferrous ions continuously supplied from such materials over long periods of time are conducive to the growth of algae, especially phytoplankton. The constituents of the vitreous materials are within the ranges described earlier.

A vitreous, algae growing material of this invention is prepared by mixing appropriate quantities of known materials containing silicon, boron, iron, and sodium and/or potassium. The mixture is then vitrified by a known process consisting of fusing by heating at a high temperature (for example, at 1200 to 1500° C. for approximately 20 to 60 minutes) and subsequent cooling. In this vitrifying process, ferrous ion content of the glass can be increased by carrying out fusion in a reducing atmosphere obtained by the use of coke or other reducing agent or carbon monoxide or other reductive gas.

A porous, vitreous material of this invention is prepared either by preparing a vitreous material containing a necessary quantity of ferrous ions and fusing a mixture of the vitreous material thus prepared and a foaming material under heat or by simultaneously fusing a vitreous material and a foaming material under heat.

For example, a porous, vitreous material is prepared by mixing 100 parts by weight of a powder of a vitreous material prepared as described above (preferably having an average particle size of 300 μm or under) with 1 to 10 parts by weight (preferably 2 to 5 parts by weight) of a powder of silicon carbide or carbon and heating the mixture at 600 to 900° C. for approximately 5 to 60 minutes using an electronic oven or other similar device.

The same goal can be achieved by injecting air, nitrogen or other similar inert gas into a fused vitreous material (a process known as "bubbling").

Porous, vitreous materials can be obtained by also bringing a fused, vitreous material into contact with such compounds as sodium phosphate and potassium phosphate that generate gas through thermal decomposition or by adding coke or other reducing agent that generate gas when combined with oxygen to the starting materials and fusing the mixture under heat.

Although the shape and properties of the porous vitreous materials according to this invention are not limited, it is preferable that they have spherical or an irregularly crushed shape 3 to 100 mm across (preferably 5 to 5 mm across).

The algae growing materials according to this invention are used in various shapes, plates, sheets, powders, lumps, spherical, and crushed forms, either singly or in combination. Increasing the surface area by making the surface of the algae growing materials rough increases the release rate of iron ions therefrom. As described in the following, the algae growing materials of this invention are ideally suited to growing and increasing phytoplankton and algae in natural seas and also in artificial culture facilities.

For example, lumps or granules of the vitreous algae growing materials of this invention put in bags may be placed in the water of culture tanks to grow sea urchin, abalone, turban shell and other shellfish. Then, the vitreous materials promote the growth of the young of sea urchin and shellfish by effectively increasing the numbers of diatoms (microscopic algae) that serve as their food.

Ferrous ions are indispensable for the mass culture of floating diatom; feeding bivalves and microalgae, feeding fish and shellfish in artificial rearing installations. Therefore, the vitreous algae growing materials of this invention stably releasing ferrous ions over long periods of time are ideal. They are particularly ideal for the continuous mass culture of species of microalgae containing large quantities of β-carotene.

Also in the culture of seaweeds, especially the kelps known as Undaria (wakame) and Laminaria (kombu), which are sometimes tended in water tanks or other artificial systems until they have grown from sporophyte to young fronds. Granules of the vitreous algae growing materials of this invention placed in such water tanks will promote the growth of their spores to young fronds measuring approximately a few millimeters in size.

The vitreous algae growing materials are sometimes used in porous forms.

Ferrous ions are essential for the growth of phytoplankton. Some sea areas though, containing much nitrogen, phosphorus and silica ions, do not permit the multiplication of phytoplankton because of the shortage of iron. If a vitreous algae growing material, particularly a porous one, of this invention is added, such sea areas will become capable of permitting the multiplication of phytoplankton. Containing not only iron ions but also silica ions, the vitreous algae growing materials of this invention are suited for the rearing of floating diatoms.

The vitreous algae growing materials of this invention can also be used for artificial reefs. The vitreous, algae growing materials may be coated or affixed, either singly or as a mixture with other materials, on part or the whole of other structures (of concrete, steel, stone, waste from construction sites, natural rock, etc.) or used on parts of such structures.

The algae growing materials according to this invention, thus placed in the sea, release stably ferrous iron and silica ions over long periods of time, thereby contributing to the growth of algae, and aid in the gathering of fish and shellfish preying on such algae, and in the fixing of carbon dioxide.

It is said to be preferable that algae growing materials contain phosphorus and manganese; 1 to 30 weight percent as $P_2O_5$ and 0.1 to 5 weight percent as MnO. They also contain $Al_2O_3$ and some other impurities. This invention does not exclude the existence of these components.

EXAMPLE 1

100 parts of silica sand, 13.9 parts of soda ash, 36.1 parts of potassium carbonate, 28.7 parts of hematite, 11.5 parts of coke, and 312.3 parts of boric acid, all by weight, were mixed in a mixer. A crucible fed with the obtained mixture was put in an electric oven preheated to 1400° C. and allowed to melt for 30 minutes. By dropping the molten product thus obtained on to a steel plate, an algae growing material in glass-sheet form having the properties shown in Table 1 was obtained.

Example for Comparison 1

A powder of hematite, silica sand, potassium phosphate and phosphoric acid was weighed so that the compositions shown in Table 1 would be obtained. Then, it was thoroughly mixed with coke and put in a crucible. The crucible was put in an oven preheated to 1400° C. in which a reducing atmosphere was maintained by supplying town gas. Vitreous materials obtained by placing the mixtures under heat for 1 hour were then cooled to room temperature. Table 1 shows molded vitreous materials A, B and C (algae growing materials for comparison) thus obtained.

TABLE 1

| Algae growing materials | Chemical Compositions (In % by weight) | | | | | | | |
|---|---|---|---|---|---|---|---|---|
| | FeO | $Fe_2O_3$ | $SiO_2$ | $Na_2O$ | $K_2O$ | $P_2O_5$ | $B_2O_3$ | Others |
| Example 1 | 6.7 | 1.7 | 29.7 | 2.4 | 7.3 | — | 52.2 | 0.02 |
| Example A for comparison | 11.8 | 2.9 | 37.5 | — | 39.3 | 8.4 | — | 0.03 |
| Example B for comparison | 5.0 | 1.2 | 57.6 | 13.5 | 12.4 | 10.2 | — | 0.05 |
| Example C for comparison | 21.8 | 5.5 | 46.5 | 13.6 | 8.3 | 4.2 | — | 0.04 |

(1) Accelerated Ion Release Test

The algae growing material obtained as Example 1 and Examples A, B and C for comparison were crushed into particles 300 to 850 μm in diameter. 10 grams each of the crushed samples were taken and boiled for 2 hours in 100 ml of seawater heated to approximately 100° C. Then, the contents of iron, silicon, sodium, potassium, phosphate, and boron in the boiled solutions were determined, along with the pH thereof. The contents of iron, manganese and silicon were determined by the method disclosed in Japanese Provisional Patent Publication No. 335330 of 1994. The contents of boron and phosphorus were determined by spectroscopic analysis using inductively coupled plasmas. The content of sodium and potassium was determined by diluting the eluates obtained in the ion release test and applying an atomic absorption analysis (the frame method) thereto.

Table 2 shows the results of analytical determination and the pH's of the individual boiled solutions. In Table 2, the value 0 is assigned to the contents below the limit of detection.

TABLE 2

| Amounts released | Total iron | $SiO_2$ | $Na_2O$ | $K_2O$ | $P_2O_5$ | $B_2O_3$ | pH |
|---|---|---|---|---|---|---|---|
| | | | | | | (In mg/100 ml) | |
| Example 1 | 103.1 | 3.41 | 170 | 530 | — | 4110 | 6.2 |
| Example for comparison A | 0.06 | 0.03 | — | 1940 | 384 | — | 11.65 |
| Example for comparison B | 0 | 5.7 | 200 | 160 | 0.84 | — | 8.9 |
| Example for comparison C | 0.04 | 0 | 300 | 14.5 | 0.13 | — | 8.8 |

As is evident from the results shown in Table 2, the algae growing materials consisting of the vitreous materials of this invention release a remarkably large quantity of total iron while having a pH of 6.2 representing a level of acidity very close to neutrality. That is, the algae growing materials of this invention proved to release iron, including divalent iron, ions at high rates.

(2) Ion Release Test at Ordinary Temperature

The algae growing materials obtained in Example 1 and Example for Comparison 1-B were crushed into particles between 300 and 850 μm in diameter. Approximately 0.2 g and 1 g of the granulated specimens were taken from the materials prepared in Example 1 and Example for Comparison 1-B, respectively. Each of the specimens was immersed in 200 ml of seawater at 20° C. (with a pH of 8.0), continuously stirred with a stirrer, and then allowed to stand. The release rate of iron in seawater at ordinary temperature was investigated by determining the contents of total iron in each sample of seawater 10 minutes, 30 minutes, 45 minutes, 1 hour, 2 hours and 3 hours after the start of allowing to stand and stirring. The results are shown in Table 3.

In this release test at ordinary temperature, the total iron content was measured to determine the difference in the release rate between the conventional algae growing materials and those according to this invention.

TABLE 3

| Algae Growing Material | Weight of Specimen (g) | Total Iron Release Rate (μg/g/hr) |
|---|---|---|
| Example 1 (Not stirred) | 0.2167 | 60.0 |
| Example 1 (Stirred) | 0.2033 | 407.2 |
| Example for comparison 1-B (Not stirred) | 0.9759 | 4.7 |

TABLE 3-continued

| Algae Growing Material | Weight of Specimen (g) | Total Iron Release Rate (μg/g/hr) |
|---|---|---|
| Example for comparison 1-B (Stirred) | 1.1004 | 4.6 |

(Note)
Particle size: 300 to 850 μm

As is obvious from Table 3, the release rate of total iron in seawater at ordinary temperature differs significantly between the algae growing material of this invention and the one prepared for the purpose of comparison.

EXAMPLES 2–5

An algae growing material consisting of vitreous material according to this invention was prepared in the same manner as in Example 1, except that the contents of fluttery silica sand, soda ash, potassium carbonate and hematite were varied as shown in Table 4.

TABLE 4

| Algae growing materials | Chemical Compositions (In % by weight) | | | | | | |
|---|---|---|---|---|---|---|---|
| | FeO | $Fe_2O_3$ | $SiO_2$ | $Na_2O$ | $K_2O$ | $B_2O_3$ | Others |
| Example 2 | 6.5 | 1.6 | 28.9 | 3.0 | 9.0 | 50.8 | 0.02 |
| Example 3 | 6.6 | 1.6 | 33.5 | 3.1 | 9.1 | 46.1 | 0.03 |
| Example 4 | 9.3 | 2.3 | 27.9 | 2.9 | 8.7 | 48.9 | 0.02 |
| Example 5 | 6.6 | 1.7 | 29.4 | 6.0 | 4.8 | 51.6 | 0.02 |

An accelerated release test was conducted by the method described earlier. Table 5 shows the results of an analytical determination and the pH's of the individual boiled solutions. The content of boron was not determined as it was not considered an active ingredient of the algae growing material.

TABLE 5

| Amounts released | Total iron | $SiO_2$ | $Na_2O$ | $K_2O$ | pH |
|---|---|---|---|---|---|
| | | | | | (In mg/100 ml) |
| Example 2 | 30.9 | 3.6 | 200 | 520 | 6.3 |
| Example 3 | 5.40 | 4.4 | 100 | 400 | 6.9 |
| Example 4 | 48.8 | 3.8 | 200 | 470 | 6.6 |
| Example 5 | 15.2 | 3.5 | 400 | 310 | 6.5 |

The results in Table 5 show that the algae growing material consisting of vitreous material of this invention exhibit significantly high total iron release rates and pH in the range of 6.3 to 6.9 representing a level of acidity very close to neutrality. That is, the algae growing material according to this invention releases iron including ferrous ions at high rates without raising the value of pH in the surrounding environment.

EXAMPLE 6

(1) Preparation of Porous Vitreous Material 100 parts by weight of the vitreous material prepared in Example 1 was crushed. The crushed material was mixed with 1 to 5 percent by weight of silicon carbide. Then, porous vitreous materials were obtained by heating the obtained mixture at 710° C. for 15, 30 and 45 minutes. The obtained porous vitreous materials had the same chemical composition as the starting material, and obtained indicated specific gravities as shown in Table 6.

TABLE 6

| Heat Treatment Time | Percent Addition of Foaming Agent | | |
|---|---|---|---|
| | 1% | 3% | 5% |
| 15 minutes | 0.51 | 0.40 | 0.30 |
| 30 minutes | 0.40 | 0.28 | 0.25 |
| 45 minutes | 0.36 | 0.22 | 0.20 |

In the specimen prepared by adding a 1 percent foaming agent with a heat treatment for 15 minutes, foamed pores were independent but small, under 1 mm, in diameter, with a higher specific gravity. The specimen prepared by adding 5 percent foaming agent with a heat treatment for 45 minutes, foamed pores were larger, between 5 and 10 mm, and had somewhat lower structural strength. The number of foamed pores did not increase in proportion to the increase in the percentage of foaming agent addition. The percent addition between 1 and 5 percent was a practically appropriate range.

(2) Preparation of Specimens According to This Invention

The specimen prepared by adding a 3 percent foaming agent with a heat treatment for 30 minutes proved to have adequate buoyancy, with uniformly distributed foamed pores, 1 to 2 mm in size, adequate structural strength, and a specific gravity as small as 0.28.

This porous vitreous material was crushed into a specimen with a particle size of 2 to 7 mm (porous specimen 1) and a specimen with a particle size of 7 to 13 mm (porous specimen 2). These two specimens had independent foamed pores of 1 to 2 mm in diameter.

(3) Preparation of Specimens for Comparison

The vitreous material prepared in Example 1 was crushed to a specimen with a particle size of 2 to 7 mm (nonporous specimen 1) and a specimen with a particle size of 7 to 13 mm (nonporous specimen 2).

(4) Divalent Iron Ion Release Test in Seawater 0.5 to 4 g of each specimen ware put in 200 liters of seawater at room temperature (approximately 20° C.) and allowed to stand for 15 minutes to 2 hours. Then, the concentration of ferrous ion in the seawater was determined by the silica-gel column method using 8-hydroxyquinoline. Table 7 shows the values thus determined. In Table 7, the release rates of ferrous iron ions ($Fe^{2+}$) are the values converted for the addition of 1 g of each specimen.

(5) Test Results

TABLE 7

| Specimen | Particle Size | Immersion Time | Release Rate of $Fe^{2+}$ |
|---|---|---|---|
| Nonporous specimen 1 | 2–7 mm | 2 hours | 0.5 µg/g/hr |
| Porous specimen 1 | 2–7 mm | 15 minutes | 26 µg/g/hr |
| Nonporous specimen 2 | 7–13 mm | 2 hours | 0.06 µg/g/hr |
| Porous specimen 2 | 7–13 mm | 15 minutes | 11 µg/g/hr |

The porous vitreous materials according to this invention having independent foamed pores and lower specific gravities float and drift on the sea surface. Having greater areas of contact with water, in addition, the porous vitreous materials have greater ferrous ion release rates than the nonporous vitreous materials of the same composition. The porous specimens 1 and 2 have 52 times and 183 times respectively, greater release rates than the non-porous specimens 1 and 2.

Also, the release rate increases with decreasing particle size. Therefore, the required ferrous ion release rate and supply to the target sea area can be determined by adjusting the particle size.

To achieve effective growth of phytoplankton, individual sea areas require iron for different lengths of time. It is said that such periods are three months for the Antarctic Ocean, twelve months for the equatorial region, and six months for the sub-Arctic regions. To save the costs of transportation and spraying, it is necessary to adjust the duration of iron release. The duration of iron release can be controlled by adjusting the chemical composition, particle size of foamed pores of the porous vitreous materials according to this invention.

Industrial Applicability

As discussed above, the algae growing materials of this invention promote the growth of algae and multiplication of phytoplankton when they are placed on or near the sea surface or at depths with adequate light penetration or in rearing facilities on land. The algae growing materials of this invention are particularly suited for the promotion of the multiplication of phytoplankton in cultivation. Also, they can be used as, for example, artificial reefs by coating them on other structures or by incorporating them in such structures. Furthermore, porous vitreous materials having lower specific gravities drift on the sea surface or at depths with light penetration while stably releasing ferrous ions over long periods of time. Besides, the release time can be controlled to the required period by adjusting the particle size.

The vitreous materials containing silicon are conducive to the growing of phytoplankton. Phytoplankton form the base of the food chain. The multiplied phytoplanktons will feed living things of higher orders, thus increasing the number of fishes and, as a consequence, the volume of fishery production.

When phytoplankton increase, their photosynthesising fixes the carbon dioxide in seawater, in algae, with some portions thereof sinking to greater depths, thereby fixing carbon in the depths of the sea. Some phytoplankton will feed living things of higher orders while some portions of such living things will become human food, thus promoting the progress of favorite material cycles.

A shortage of carbon dioxide in the sea can be made up by taking in part of the carbon dioxide released into the atmosphere by the burning of fossil fuels. The resulting reduction in carbon dioxide in the atmosphere will permit a reduction of global warming.

What is claimed is:

1. An algae growing material consisting of a vitreous material capable of releasing ferrous ions into water and consisting essentially of 15 to 50 weight percent $SiO_2$, 1 to 35 weight percent either or both of $Na_2O$ and $K_2O$, 30 to 70 weight percent $B_2O_3$, and 1 to 40 weight percent either or both of FeO and $Fe_2O_3$.

2. An artificial reef for rearing algae, comprising or covered with, at least in part, a vitreous material capable of releasing ferrous ions into water consisting essentially of 15 to 50 weight percent $SiO_2$, 1 to 35 weight percent either or both of $Na_2O$ and $K_2O$, 30 to 70 weight percent $B_2O_3$, and 1 to 40 weight percent either or both of FeO and $Fe_2O_3$.

3. An algae growing material consisting of a porous vitreous material capable of releasing ferrous ions into water, containing 1 to 40 weight percent either or both of FeO and $Fe_2O_3$, having independent foamed pores and a specific gravity of 0.1 to 1.0.

4. An algae growing material according to claim 3, wherein the vitreous material further contains 15 to 50 weight percent $SiO_2$, 1 to 35 weight percent either or both of $Na_2O$ and $K_2O$, 30 to 70 weight percent $B_2O_3$.

* * * * *